United States Patent
Yang et al.

(10) Patent No.: US 9,091,295 B1
(45) Date of Patent: Jul. 28, 2015

(54) SAFETY HOOK

(71) Applicant: Aerohook Technology Co., Ltd., Taichung (TW)

(72) Inventors: Kai Chieh Yang, Taichung (TW); Yang Tsung Chen, Taichung (TW); Yi Ching Lin, Taichung (TW)

(73) Assignee: AEROHOOK TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 14/267,927

(22) Filed: May 2, 2014

(51) Int. Cl.
*A44B 13/00* (2006.01)
*F16B 45/02* (2006.01)
*A62B 35/00* (2006.01)

(52) U.S. Cl.
CPC .............. *F16B 45/02* (2013.01); *A62B 35/0037* (2013.01); *Y10T 24/45361* (2015.01); *Y10T 24/45366* (2015.01)

(58) Field of Classification Search
CPC ................ F16B 45/02; Y10T 24/3492; Y10T 24/45257; Y10T 24/45277; Y10T 24/4534; Y10T 24/45361; Y10T 24/45366; Y10T 24/45372
USPC ............... 24/375, 598.1, 599.5, 599.9, 600.1, 24/600.2, 600.8, 601.4
See application file for complete search history.

(56) References Cited

U.S. PATENT DOCUMENTS

| | | | | |
|---|---|---|---|---|
| 1,949,608 | A | * | 3/1934 | Johnson ........................ 24/599.5 |
| 6,283,524 | B1 | * | 9/2001 | Simond ........................ 294/82.2 |
| 8,117,721 | B2 | * | 2/2012 | Yang ............................ 24/599.5 |
| 2008/0104809 | A1 | * | 5/2008 | Lin .............................. 24/600.1 |
| 2010/0162531 | A1 | * | 7/2010 | Hong .......................... 24/265 H |
| 2011/0113602 | A1 | * | 5/2011 | Chen ........................... 24/599.5 |
| 2011/0113603 | A1 | * | 5/2011 | Yang ........................... 24/599.6 |
| 2011/0126386 | A1 | * | 6/2011 | Liang .......................... 24/599.5 |
| 2012/0102688 | A1 | * | 5/2012 | Yang ........................... 24/600.1 |
| 2012/0210542 | A1 | * | 8/2012 | Yang ............................... 24/369 |
| 2013/0025095 | A1 | * | 1/2013 | Yang ........................... 24/599.5 |
| 2013/0160252 | A1 | * | 6/2013 | Lin .............................. 24/601.5 |

* cited by examiner

*Primary Examiner* — Robert J Sandy
*Assistant Examiner* — David Upchurch
(74) *Attorney, Agent, or Firm* — Raymond Y. Chan; David and Raymond Patent Firm (57) ABSTRACT

A safety hook including a hook body, a latch member, a locking portion, and a control member is disclosed. The latch member is capable of rotating about a guide pin and swinging along a guide slot in an arc-shaped path to open or close a hook opening, wherein when the latch member locks and closes the hook opening, the locking portion and the guide pin form a locked chain structure to bear a lateral impact force on the latch member. When the latch member rotates about the guide pin and swings along the guide slot in an arc-shaped path to open or close the hook opening, the control member is capable of driving the locking edge to release the locking portion, so as to open the hook opening by a swinging movement of the latch member.

10 Claims, 8 Drawing Sheets

SAFETY HOOK

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to a safety hook, and more particularly to a novel safety hook that is adapted for effectively enlarging a hook opening and elongating a latch member thereof, so that the operation of the entire device is fast and convenient.

2. Description of Related Arts

A safety hook and a safety belt are required in a situation requiring ascending or descending operations such as rock climbing, mountaineering, and building construction for ensuring the security of people.

Therefore, the inventor herein has developed an invention disclosed in U.S. Pat. No. 8,117,721 entitled "Snap Hook Having Pivotal Lock". Due to its good performance, the snap hook is well received in the market. However, the inventor herein does not feel satisfied with this achievement and finds that, in the snap hook of the aforesaid patent, when a lateral impact force is applied on the latch member, the lateral impact force can only be transmitted to the hook body through a locking portion, and thus a stress concentration may easy to occur, so that the length of the latch member is greatly limited and the size of the hook opening cannot be larger. Therefore, a user can not complete a hook locking action or a hook releasing action through a single operation, so that the operation is complicated and inconvenient, and the value of the product is greatly affected.

In view of the above mentioned problem, the inventor herein has devoted much effort in researching and finally develops a safety hook that is adapted for effectively enlarging a hook opening and elongating a latch member thereof, so that the hook locking action and the hook releasing action is smoothly and fast to operate.

SUMMARY OF THE PRESENT INVENTION

The present invention provides a safety hook comprising a hook body, a latch member, a main spring, and a control member.

The hook body has a hook hole, a first pivot hole, a guide slot, and a hook opening which communicates the hook hole to outside, wherein the hook hole, the first pivot hole, and the hook opening penetrate through a thickness of the hook body respectively, wherein the guide slot is constructed in arc-shape with the first pivot hole as a center thereof, wherein the hook body further comprises a locking portion protruded out of the thickness of the hook body.

The latch member comprises two side panels along the thickness for covering the guide slot, wherein each of the two side panels comprises a locking edge for coupling with the locking portion, wherein the two side panels have a first guide hole, wherein a guide pin inserting and penetrating through the guide slot is coupled with the first guide hole, wherein latch member is capable of rotating about the guide pin and swinging along the guide slot in an arc-shaped path to open or close the hook opening, wherein when the latch member locks and closes the hook opening, the locking portion and the guide pin form a locked chain structure to bear a lateral impact force on the latch member.

The main spring, which is arranged for actuating and driving the latch member, retains the locking edge at a position to bias against the locking portion, so as to retain the latch member to lock and close the hook opening.

The control member comprises a main shaft coupling with the first pivot hole, and has a second guide hole for coupling with the guide pin, wherein when the latch member rotates about the guide pin and swings along the guide slot in an arc-shaped path to open or close the hook opening, the control member is capable of driving the locking edge to release the locking portion, so as to open the hook opening by a swinging movement of the latch member.

Therefore, when the latch member of the present invention locks and closes the hook opening and is applied with a lateral impact force, the stress can be transmitted to the hook body through the locking portion and the guide pin, and the main spring and the second spring can absorb a part of the stress, so that the present invention can effectively distribute the stress, so that besides the basic requirement of fulfilling the demands of the security of the configuration, the safety hook of the present invention is adapted for effectively enlarging a hook opening and elongating a latch member, so that the hook locking action and the hook releasing operation of the device are convenient and fast.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1 to 5 of the drawings, a safety hook according a preferred embodiment of the present invention comprises a hook body 10, a locking portion 20, a latch member 30, and a control member 40.

The hook body 10, which defines a thickness 10C between a front side 10A and a rear side 10B thereof, has a hook hole 11 and a receiving groove 12 penetrating through the thickness 10C respectively. At a first side of the hook body 10, the hook body 10 has a hook opening 110 that communicates the hook hole 11 to outside, and a mouth seat 13 formed as an end of the hook opening 110. The mouth seat 13 has a mouth groove 131 that faces the hook hole 11, and comprises a mouth block 132 provided at a position between the mouth groove 131 and the hook opening 110. At a second side of the hook body 10, the hook body 10 has an opening 120 that communicates with the receiving groove 12. An opening 120 and a hook opening 110 are respectively provided at two opposed sides of the hook body 10. The hook body 10 has a first pivot hole 14, which penetrates through the thickness 10C, at a position below the receiving groove 12. An arc-shaped guide slot 15 penetrating through the thickness 10C, with the first pivot hole 14 as a center thereof, is provided at a second end portion of the hook opening 110. The guide slot 15 has two opposite closed ends. In addition, the hook body 10 further has a pin hole 16 that penetrates through the thickness 10C at a position between the first pivot hole 14 and the guide slot 15. A bottom edge portion of the hook body 10 is provided with a hanging hole 17 that penetrates through the thickness 10C for coupling with a safety belt.

The locking portion 20, which is provided in the latch hole 16, has two symmetrical end portions that protrude from the thickness 10C respectively. The locking portion 20 can also be integrally formed with the hook body 10.

The latch member 30, which is a frame having a substantial U-shaped cross section, comprises a latch panel 31 for locking and closing the hook opening 110. At a first end of the latch panel 31, the latch panel 31 comprises a positioning block 311 that is capable of inserting into the mouth groove 131 along a direction from the hook hole 11 towards the hook opening 110, and has a clipping slot 312 for inserting the mouth block 132, wherein the positioning block 311 and the clipping slot 312 enable the first end of the latch panel 31 to retain at the mouth seat 13. At a second end of the latch panel 31, the latch panel 31 is provided with a cut groove 313 that is shaped and sized to couple with the thickness 10C in such a manner that the latch panel 31 is capable of moving along the thickness 10C. The second end of the latch panel 31 further comprises two side panels 32 extended to cover the front and rear sides of the guide slot 15 respectively. The two side panels 32 have a first guide hole 33 penetratedly formed at an upper side of the guide slot 15 for coupling with a guide pin 34. The guide pin 34 penetrates through the upper side of the guide slot 15 in such a manner that the latch member 30 is capable of opening and closing the hook opening 110 more quickly by means of the rotation of the guide pin 34 and the arc-shaped swinging movement of the guide pin 34 along the guide slot 15. When the latch member 30 locks the hook opening 110, the two side panels 32 have locking edges 35 biasing against the locking portion 20 respectively, so that when the latch member 30 is applied with a lateral impact force, the latch member 30 and the hook body 10 form a locked chain structure, so that the stress can be transmitted to the hook body 10 through the locking portion 20 and the guide pin 34. In addition, each of the two side panels 32 comprises a retention section 36 upwardly extended from the locking edge 35, and an arc section 37, which is constructed in arc-shape with the guide hole 33 acting as a center thereof, extended from a top end of the retention section 36. The outer circumferences of the guide pin 34 at a position between the side panels 32 and the thickness 10C are respectively wound around by the main spring 38. The main spring 38 has a first biasing member 381 is extended therefrom for resiliently biasing a surface about the hook hole 11 and a second biasing member 382 extended therefrom for pushing against an inner surface of the latch panel 31 by a predetermined resilient force, so that the positioning block 311 and the clipping slot 312 can be respectively coupled and retained in position with the mouth groove 131 and the mouth block 132, and the locking edges 35 are retained at a position for biasing the locking portion 20, so as to ensure that the latch member 30 effectively locks and closes the hook opening 110.

The control member 40, which is a frame having a substantial U-shaped cross section, comprises an end panel 41 provided at the second side of the hook body 10. The end panel 41 is shaped and sized to couple with the opening 12 of the receiving groove 12. The control member 40 further comprises two cover panels 42 extended at outer sides of the two side panels 32 respectively, so as to cover the first pivot hole 14, the pin hole 16, and the first guide hole 33. The two cover panels 42 have a second pivot hole 43 at a position aligning with the first pivot hole 14 for a main shaft 44 to penetrate therethrough. The two cover panels 42 are further provided with a second guide hole 45 for coupling with the guide pin 34, and a tenon hole 46 penetrating through the two cover panels 42 at a position aligning with the guide slot 15 for coupling with a locking tenon 47 in such a manner that the locking tenon 47 inserts and penetrates though the guide slot 15, so that when the latch member 30 locks and closes the hook opening 110, the locking tenon 47 biases against the lower sides of the two side panels 32 so as to prevent the latch member 30 to move towards the guide pin 34. The outer circumferences of the main shaft 43 at a position between the two cover panels 42 and the thickness 10C are respectively wound around by a second spring 48. A third biasing member 481 is extended from the second spring 48 for resiliently biasing a surface about the receiving groove 12, and a fourth biasing member 482 is extended form the second spring 48 for pushing against an inner surface of the end panel 41 by a predetermined resilient force, so as to keep the end panel 41 away from the second side of the hook body 10, so as to resiliently couple with the opening 120, and retain the locking edge 36 at a position biasing against the locking portion 20, so as to further ensure that the latch member 30 locks and closes the hook opening 110.

Figure 1:
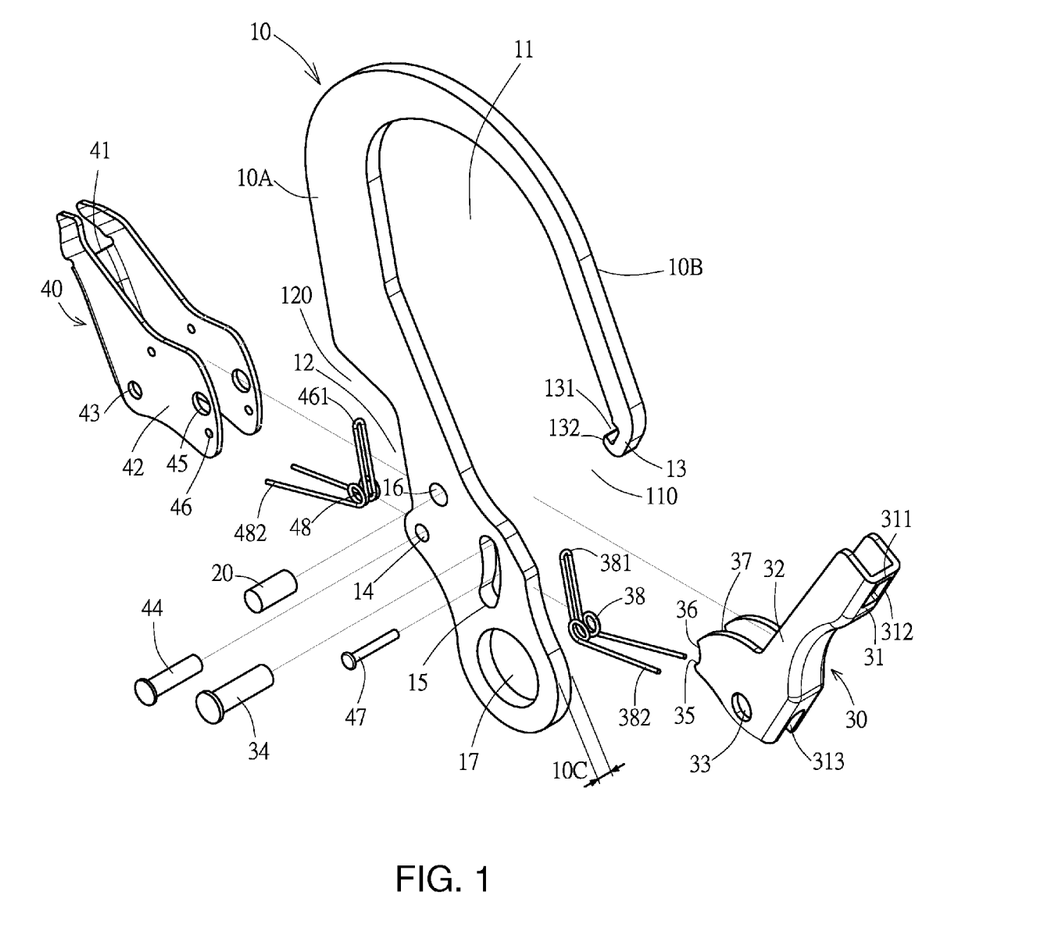
FIG. 1 is an exploded view of a safety hook according to a preferred embodiment of the present invention.
Figure 2:
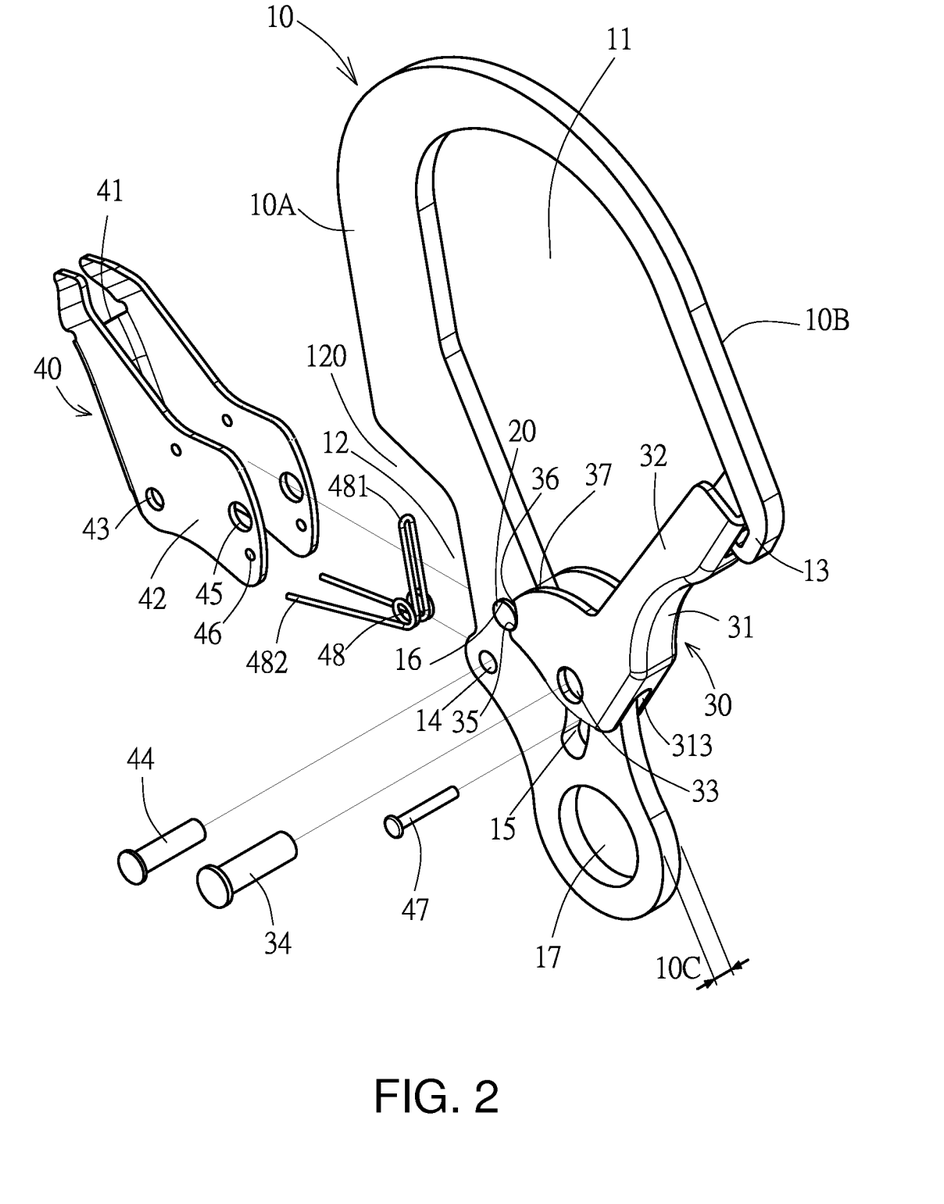
FIG. 2 is a schematic view illustrating the outer appearance of an assembly of a latch member and a hook body of the safety hook according to the above preferred embodiment of the present invention.
Figure 3:
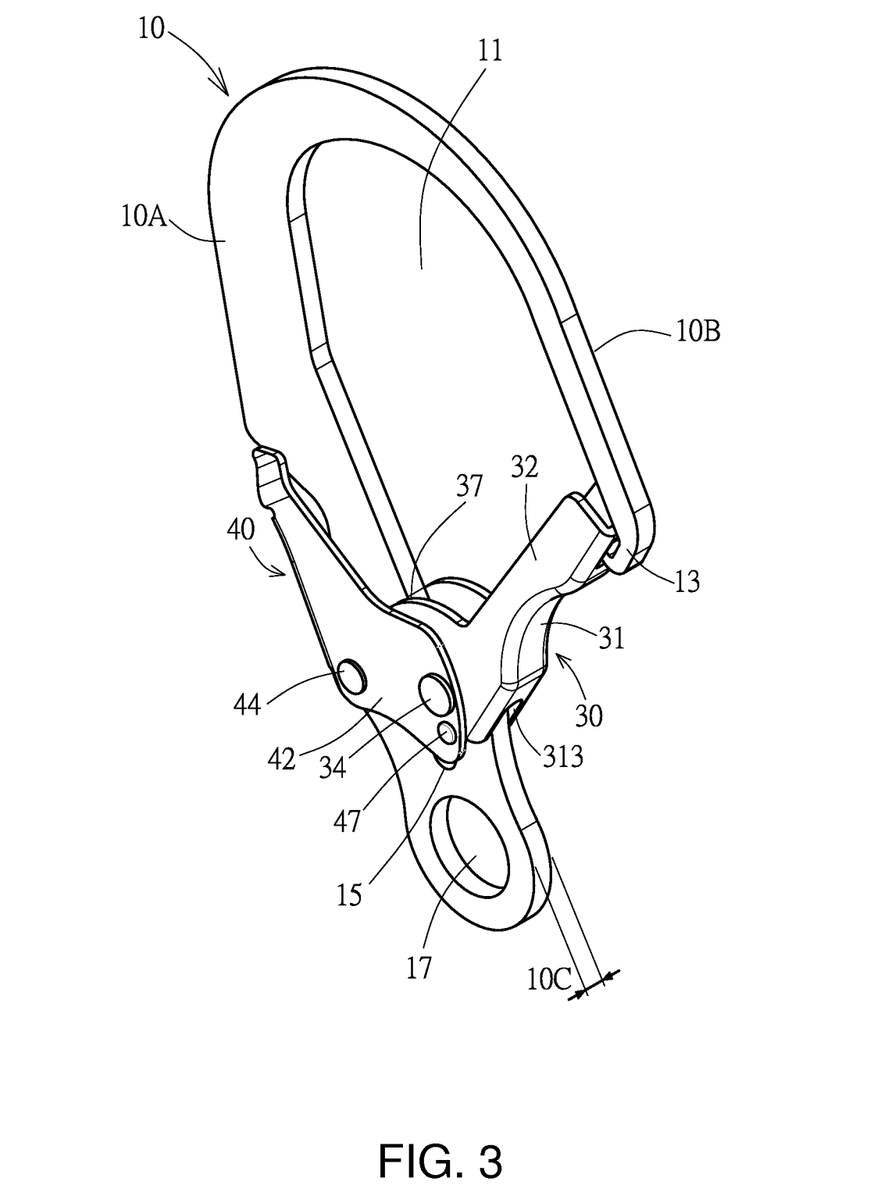
FIG. 3 is a schematic view illustrating the outer appearance of the safety hook according to the above preferred embodiment of the present invention.
Figure 4:
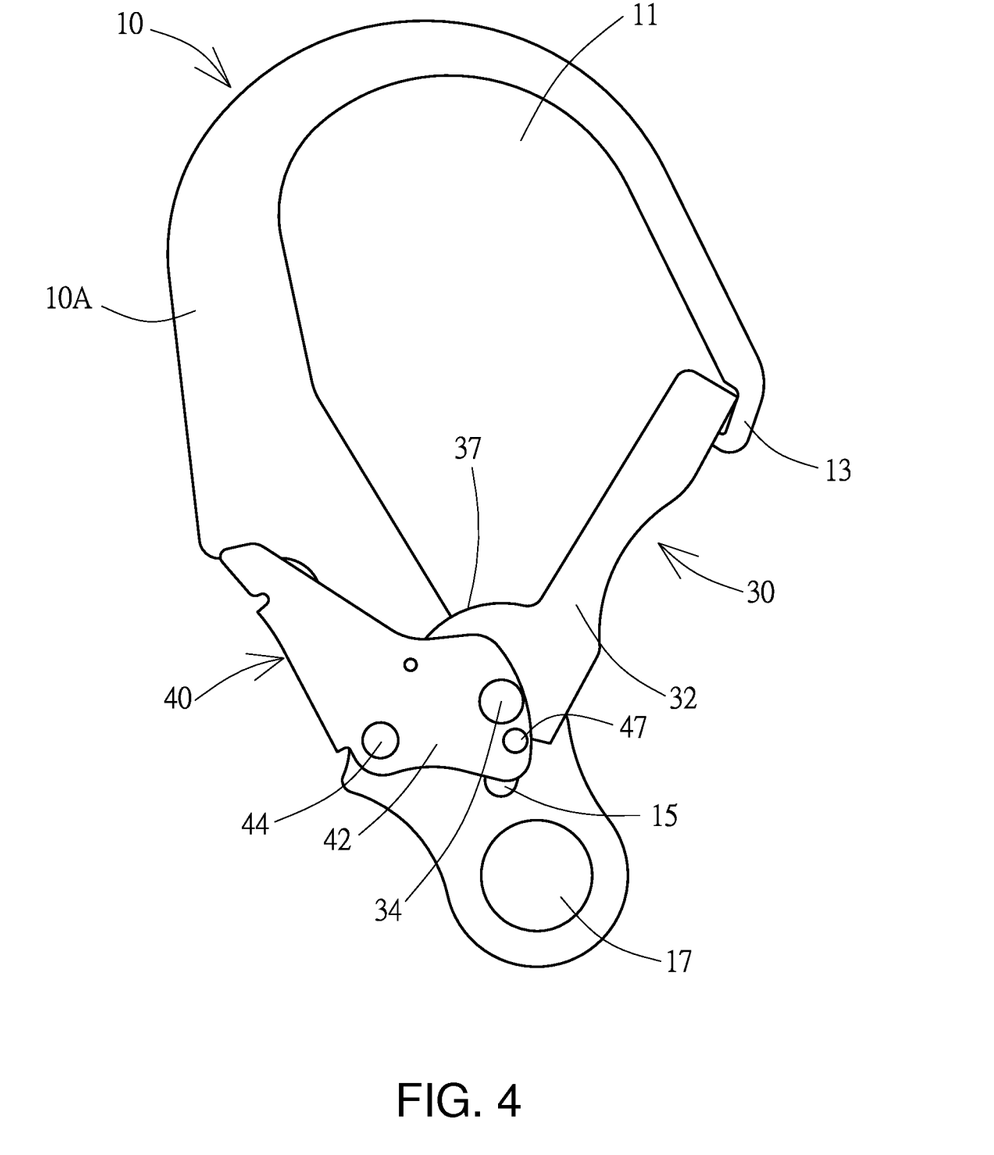
FIG. 4 is a front view of the safety hook according to the above preferred embodiment of the present invention.
Figure 5:
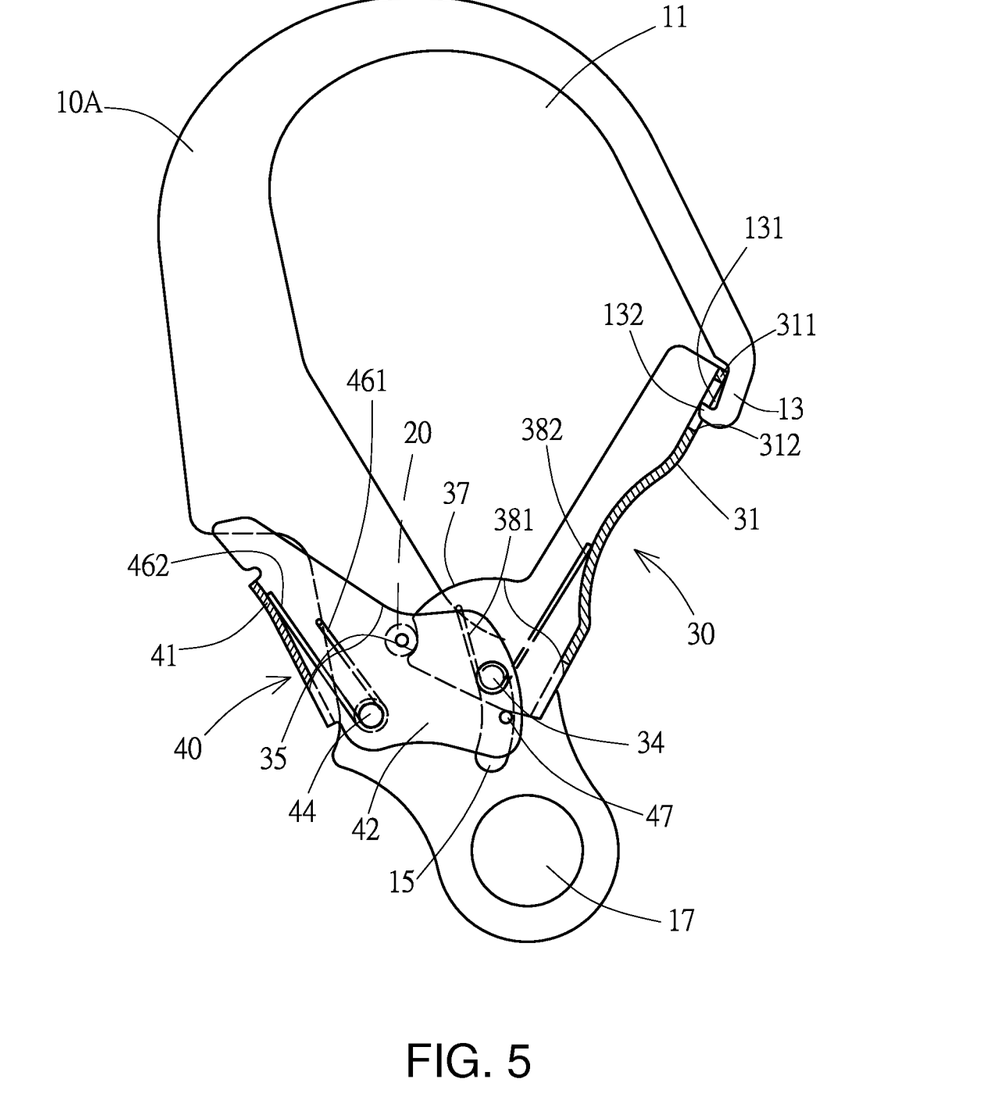
FIG. 5 is an enlarged sectional view of the safety hook according to the above preferred embodiment of the present invention.
Figure 6:
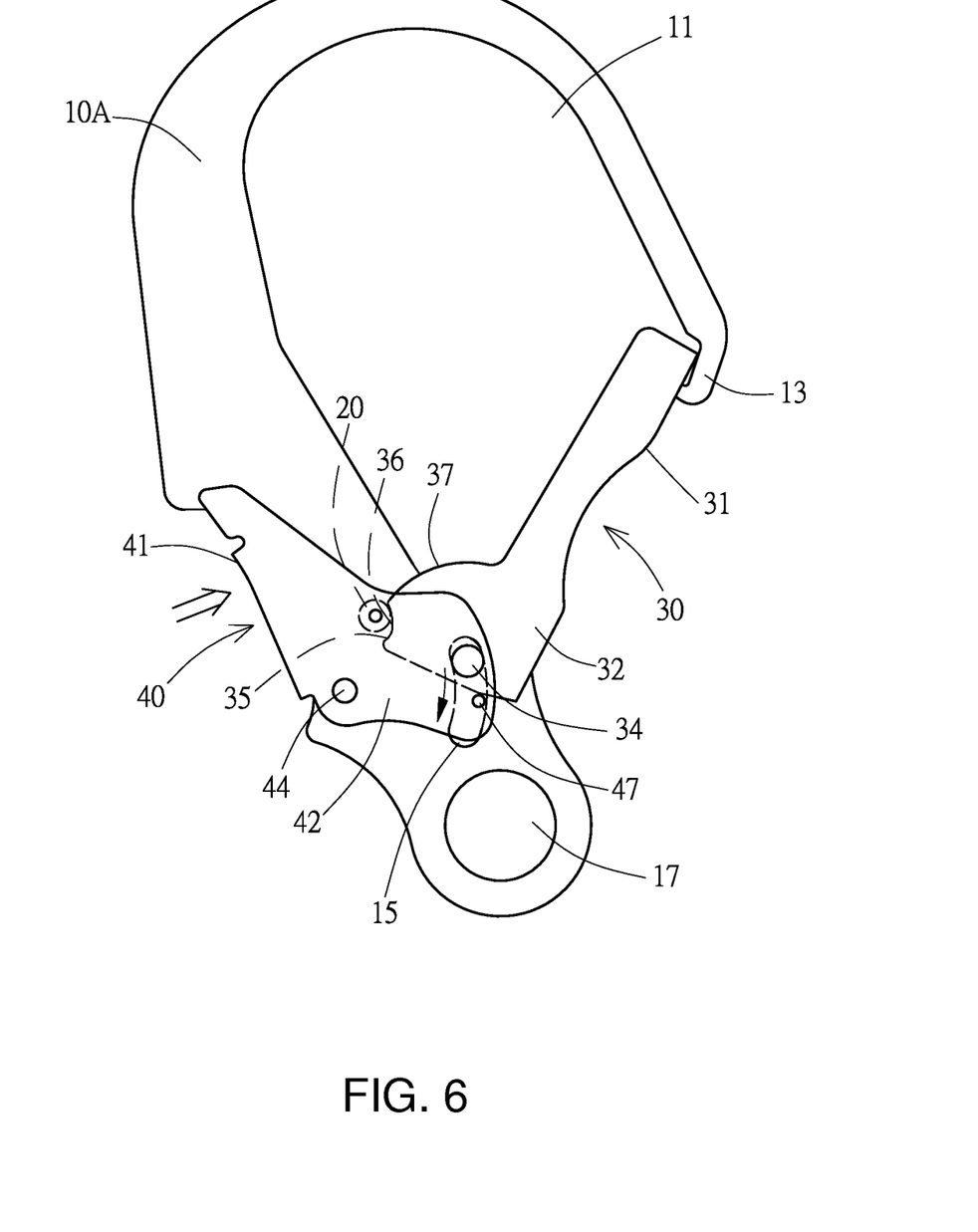
FIG. 6 is a schematic view illustrating a first operation of pressing a control member of the safety hook according to the above preferred embodiment of the present invention.
Figure 7:
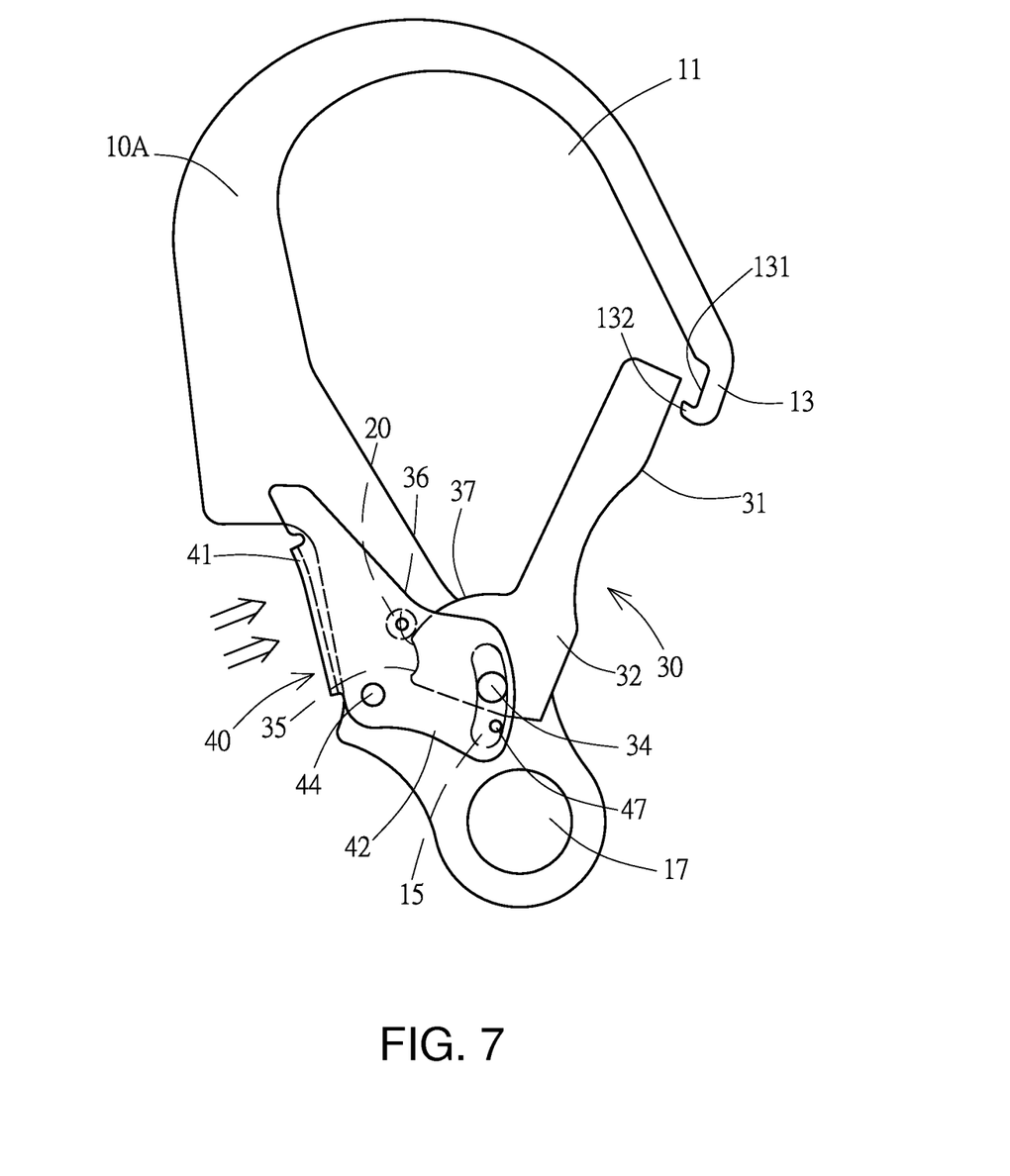
FIG. 7 is a schematic view illustrating a second operation of pressing the control member of the safety hook according to the above preferred embodiment of the present invention.
Figure 8:
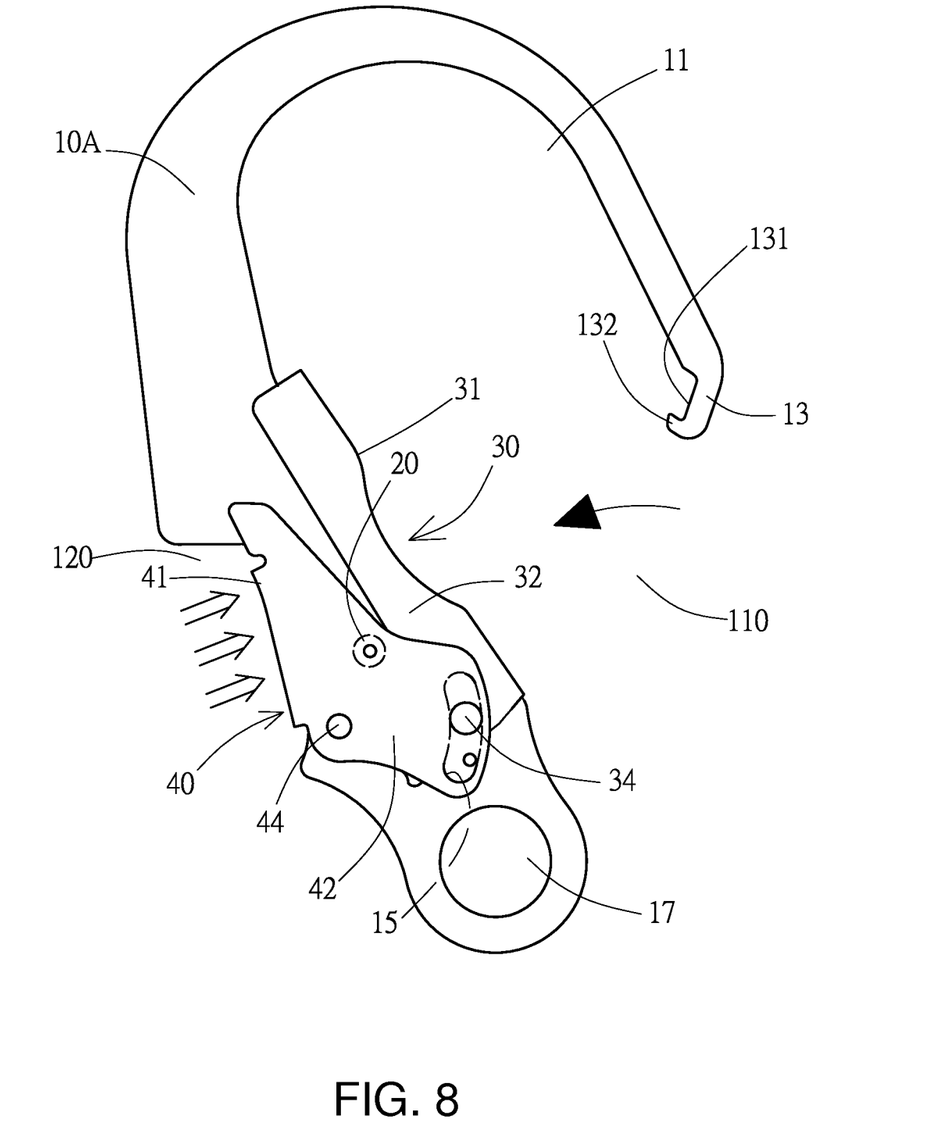
FIG. 8 is a schematic view illustrating the operation for fully opening a hook opening of the safety hook according to the above preferred embodiment of the present invention.

Referring to FIGS. 6, 7 and 8 of the drawings, when a user presses the control member 40 during a first pressing step to activate the latch member 30 by overcoming the resilient force of the second spring 48, the latch member 30 rotates about the guide pin 34 and swing along the guide slot 15 with an arc-shaped path, so as to drive the locking edge 35 to release the locking portion 20, and drive the locking tenon 47 to release the lower sides of the two side panels 32. And then, the retention section 36 can move along the locking portion 20 with a predetermined displacement, so as to retain the latch member 30 at a position for locking and closing the hook opening 110, as shown in FIG. 6 of the drawings. When the user presses the control member 40 during a second pressing step and aligns the arc section 37 with the locking portion 20, as shown in FIG. 7 of the drawings, the latch member 30 is completely released. Referring to FIG. 8 of the drawings, the user is then capable of unlocking and opening the hook opening 110 by moving the latch member 30 stably and quickly towards the hook hole 11 through pushing the latch member 30, as well as by means of the dual guiding effects provided by the guide pin 34, the arc section 37 and the locking portion 20. Therefore, the user has to use two hands to operate on the control member 40 and the latch member respectively to unlock and open the hook opening 110 of the present invention, and thus a dangerous operation, that the hook opening 110 is unlocked or opening inadvertently by unintentionally touching the control member 40 or the latch member 30, is prevented.

More importantly, when the latch member 30 of the present invention locks and closes the hook opening 110 and is applied with a lateral impact force, the stress is transmitted to the hook body 10 through the locking portion 20 and the guide pin 34, and the main spring 35 and the second spring 48 can also absorb a part of the stress, so that the present invention can effectively distribute the stress, so that besides the basic requirement of fulfilling the demands of the security of the configuration, the safety hook of the present invention is adapted for effectively enlarging a hook opening 110 and elongating a latch member 30, so that the hook locking action and the hook releasing operation of the device will be convenient and fast.

Therefore, the features and characteristics of the entire structure of the safety hook of the present invention cannot be anticipated by the conventional art, and the design is creative and outstanding. There is no similar product that is disclosed in any patent applications nor published in the market, so that the safety hook of the present invention submitted herein meets the requirements under the patent law.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A safety hook, comprising:
   a hook body having a hook hole, a first pivot hole, a guide slot, and a hook opening which communicates the hook hole to outside, wherein said hook hole, said first pivot hole, and said hook opening penetrate through a thickness of said hook body respectively, wherein said guide slot is constructed in arc-shape with said first pivot hole as a center thereof, wherein said hook body further comprises a locking portion which is protruded out of said thickness of said hook body;
   a latch member comprising two side panels along said thickness for covering said guide slot, wherein each of said two side panels comprises a locking edge for coupling with said locking portion, wherein said two side panels have a first guide hole, wherein a guide pin inserting and penetrating through said guide slot is coupled with said first guide hole, wherein latch member is capable of rotating about said guide pin and swinging along said guide slot in an arc-shaped path to open or close said hook opening, wherein when said latch member locks and closes said hook opening, said locking portion and said guide pin form a locked chain structure to bear a lateral impact force on said latch member;
   a main spring, which is arranged for actuating and driving said latch member, and retaining the locking edge at a position to bias against said locking portion, so as to retain said latch member to lock and close said hook opening; and
   a control member comprising a main shaft coupling with said first pivot hole, and having a second guide hole for coupling with said guide pin, wherein when said latch member rotates about said guide pin and swings along said guide slot in an arc-shaped path to open or close said hook opening, said control member is capable of driving said locking edge to release said locking portion, so as to open said hook opening by a swinging movement of said latch member.

2. The safety hook, as recited in claim 1, wherein said control member has a tenon hole provided at a position aligning with said corresponding guide slot, wherein a locking tenon is provided for coupling with said tenon hole in such a manner that said locking tenor inserts and penetrates through said tenon hole, wherein when said latch member locks and closes said hook opening, said locking tenon biases against end portions of said two side panels so as to ensure that said latch member will not move towards said guide pin, however, when pressing said control member by overcoming a resilient force of said second spring, said latch member is capable of rotating about said guide pin and swinging along said guide slot in an arc-shaped path, so as to simultaneously drive said locking edge to release said locking portion, and drive said locking tenor to release said end portions of said two side panels.

3. The safety hook, as recited in claim 1, wherein each of said two side panels comprises a retention section extended from said locking edge, an arc section extended from said retention section, wherein said arc section is constructed to be arc-shaped with said guide hole as a center of a circle, wherein when said control member drives said locking edge to release said locking portion, said retention section is capable of moving along said locking portion with a predetermined displacement, so as to retain said latch member at a position locking and closing said hook opening, wherein when said arc section is coupling and facing said locking section, said latch member is released to guide said latch member to swing towards said hook hole so as to open said hook opening.

4. The safety hook, as recited in claim 1, wherein said hook body further has a pin hole which penetrates through said thickness for coupling with said locking portion.

5. The safety hook, as recited in claim 1, wherein said main spring is wound around portions of said guide pin between said thickness and said two side panels, wherein a first biasing member is extended from said main spring for resiliently biasing a surface about said hook hole, wherein a second biasing member is extended from said main spring for pushing against an inner surface of said latch panel by a predetermined resilient force.

6. The safety hook, as recited in claim 1, further comprising a second spring, which is capable of driving said control member, for driving said locking edge to bias against said locking portion.

7. The safety hook, as recited in claim 1, wherein said hook opening, which communicates said hook hole to outside, is formed at a first side of said hook body, wherein said mouth seat is formed at a first side of said hook opening, wherein said guide slot, with said first pivot hole of a center of a circle, is arc-shaped constructed at an opposite second side of said hook opening, wherein said locking portion, which protrudes out of said thickness, is provided between first pivot hole and said guide slot, wherein a first end of said latch member is capable of being retained at said mouth seat while an opposite second end of said latch member is provided with said two side panels which extend along said thickness to cover front and rear sides of said guide slot, wherein at a second side of said hook body, said control member is provided with an end panel, wherein two cover panels are respectively provided at two sides of said end panel to cover said first pivot hole, said locking portion, and said first guide hole, wherein said two cover panels couple with said first pivot hole via said main shaft, wherein said second guide hole is provided for coupling with said guide pin, wherein a second spring, which is capable of driving said end panel to move away from said second side of said hook body, is provided for driving said locking edge to bias against said locking portion.

8. The safety hook, as recited in claim 7, wherein said mouth seat has a mouth groove which opens towards said hook hole, and comprises a mouth block provided at a position between said mouth groove and said hook opening, wherein said latch member comprises a latch panel for closing said hook opening, wherein an end of said latch panel comprises a positioning block which is capable of inserting into said mouth groove along a direction from said hook hole towards said hook opening, and having a clipping slot for said mouth block to insert therethrough, so as to retain said end of said latch panel at said mouth seat.

9. The safety hook, as recited in claim 7, wherein said hook body further has a receiving groove which penetrates through said thickness, wherein at said second side of said hook body, an opening is provided to communicate with said receiving groove, wherein said opening and said hook opening are respectively provided at two opposite sides of said hook body in a back-to-back manner, wherein said first pivot hole is provided at a position between said receiving groove and said guide slot, wherein said end panel of said control member is coupled at said opening through said second spring for a user to press and operate.

10. The safety hook, as recited in claim 7, wherein said second spring is wound around portions of said main shaft between said thickness and said two cover panels, wherein a third biasing member is extended from said second spring for resiliently biasing a surface about said receiving groove, wherein a fourth biasing member is extended form said second spring for pushing against an inner surface of said end panel by a predetermined resilient force.

* * * * *